United States Patent [19]

Burckhardt et al.

[11] 4,069,467

[45] Jan. 17, 1978

[54] SUPPRESSION OF OUT-OF-FOCUS ECHOES IN ULTRASONIC SCANNING

[75] Inventors: Christoph Benedikt Burckhardt, Muttenz; Pierre-André Grandchamp, Munchenstein, both of Switzerland; Heinz Hoffmann, Grenzach, Germany

[73] Assignee: Hoffmann-La Roche, Inc., Nutley, N.J.

[21] Appl. No.: 674,465

[22] Filed: Apr. 7, 1976

[30] Foreign Application Priority Data

Apr. 18, 1975 Switzerland ........................ 4988/75

[51] Int. Cl.² ................................................ G01S 9/66

[52] U.S. Cl. .................................................... 340/1 R

[58] Field of Search .................................. 340/1 R, 10

[56] References Cited

U.S. PATENT DOCUMENTS 3,836,948 9/1974 Burckhardt et al. ............... 340/1 R 3,918,024 11/1975 Macovski ............................ 340/1 R

*Primary Examiner*—Richard A. Farley

*Attorney, Agent, or Firm*—Samuel L. Welt; George M. Gould; Mark L. Hopkins

[57] ABSTRACT

An improved method and apparatus for reducing the echoes from reflectors disposed outside the focal line in an echo-sounding process using an ultrasonic field focusing in a focal line. A pulsed ultrasonic wave is transmitted having a cross-sectional area corresponding to one or more annularly arranged transducer segments having a total azimuth angle of less than 360°. Echoes of the transmitted wave are received from the spatial region corresponding to at least a part of other annular transducer segments, which complement the annular segments of the cross-sectional area of the transmitted ultrasonic pulse to form a complete ring. The radiation or receiving surfaces of the transducer segments forming the transducer ring are inclined toward the axis of the ring.

6 Claims, 3 Drawing Figures

SUPPRESSION OF OUT-OF-FOCUS ECHOES IN ULTRASONIC SCANNING

BACKGROUND OF THE INVENTION

This invention relates to a method of reducing the echoes from reflectors disposed outside the focal line in an echo-sounding process using an ultrasonic field focusing in a focal line. This invention also relates to apparatus for performing the method.

For the purpose of the present description, the term "cross-sectional area of an ultrasonic field" is defined as the surface of intersection between the ultrasonic field and a plane at right angles to the direction of propagation of the ultrasonic field.

Echo sounding processes using a convergent ultrasonic field having a substantially annular cross-sectional area are efficient in focusing the ultrasonic field through a great depth. It has been found, however, that if the ultrasonic wave used is in phase over the entire cross-sectional area and has constant amplitude, relatively large lateral maxima may occur, i.e. undesired echoes from reflectors at the side of the focal line may have a relatively large amplitude.

To reduce the echoes from reflectors outside the focal line it has already been proposed to transmit, after transmitting a first pulsed, limited ultrasonic wave which is in phase over the entire cross-sectional area, at least a second pulsed and limited ultrasonic wave which is not in phase over the entire cross-sectional area; the electric signals obtained from the echoes are provided with weighting coefficients and echoes having the same travel time are added (see e.g. Swiss Pat. No. 549,220 and U.S. Pat No. 3,836,948).

In another known method, at least two pulsed and limited ultrasonic waves are transmitted in succession, the wave amplitudes being functions of the angle $\phi$ measured in the cross-sectional area, and echoes from reflectors in and outside the focal line are received and converted into electric echo signals which are multiplied by a function of the angle $\phi$, after which the echoes having the same travel time are added (see German Offenlegungsschrift No. 2,351,352 and British patent specification No. 1,413,740).

These two known methods can greatly or almost completely eliminate echoes from reflectors outside the focal line. However, apparatus for performing these known methods requires relatively expensive circuitry, which is not always justified in view of the circumstances in which the apparatus is used.

SUMMARY OF THE INVENTION

An object of the invention, therefore, is to provide a method which can reduce lateral maxima in such echo-sounding processes but which requires less expensive circuitry than the above described known methods.

Accordingly, the present invention provides a method of reducing the echoes from reflectors disposed outside the focal line in an echo-sounding process using an ultrasonic field focusing in a focal line, which method comprises transmitting a pulsed ultrasonic wave having a cross-sectional area corresponding to one or more annular segments having a total azimuth angle of less than 360°, and receiving echoes from the spatial region corresponding to at least a part of other annular segments which complement the annular segments of the cross-sectional area of the transmitted ultrasonic pulse to form a complete ring.

The invention also provides apparatus for performing the method of the invention, which apparatus comprises an ultrasonic transducer system, a transmitter circuit for operating the transducer system, and a receiver circuit, in which apparatus the transducer system contains at least one transmitting and one receiving transducer each in the form of an annular segment, the radiation or receiving surfaces of the transducers being inclined to the axis of the ring.

According to a preferred embodiment of the method, the cross-sectional area of the transmitted ultrasonic pulse corresponds to oppositely-disposed quarter-rings and the cross-sectional area of the received ultrasonic pulse corresponds to the two remaining quarter-rings.

This method can be performed using an annular ultrasonic transducer comprising a number of separate transducer segments which together form a ring, some of the segments being connected to and simultaneously driven by the transmitter circuit and the other segments being connected to the receiving circuit.

The advantage of the method according to the invention is that there is no need to transmit one or more additional pulses or to store and add the echo signals. This results in a substantial simplification in the circuitry of the apparatus for performing the method.

BRIEF DESCRIPTION OF THE DRAWINGS

In order that the invention may be readily understood an embodimnt ther wil w b dsbd, by way of example, with reference to the accompanying drawings, in which:

FIGS. 1A and 1B show an annular ultrasonic transducer comprising an annular housing 5 having a substantially U-shaped cross-section, the axis of symmetry of the cross-sectional area of the housing being at an angle to the ring axis and intersecting it at a predetermined distance therealong. The open side of the U-shaped cross-section faces the point of intersection, i.e. faces the ring axis. Four equally-large, segmentally-shaped transducer elements 1 to 4 together form an annulus and are disposed in an annular recess in housing 5. The transducer elements comprise a piezoelectric layer deposited on an epoxy resin/tungsten attenuation block 6. The transducer elements are supplied with electricity via a vapor-deposited metal layer on the front thereof which is connected to housing 5 and individual connecting lines (not shown) extending to the back of the piezoelectric layers through bores in the housing and in the attenuation block. An epoxy layer 7 is used for matching the acoustic impedance to water and for mechanical protection of the piezoelectric oscillators.

Figure 1A:
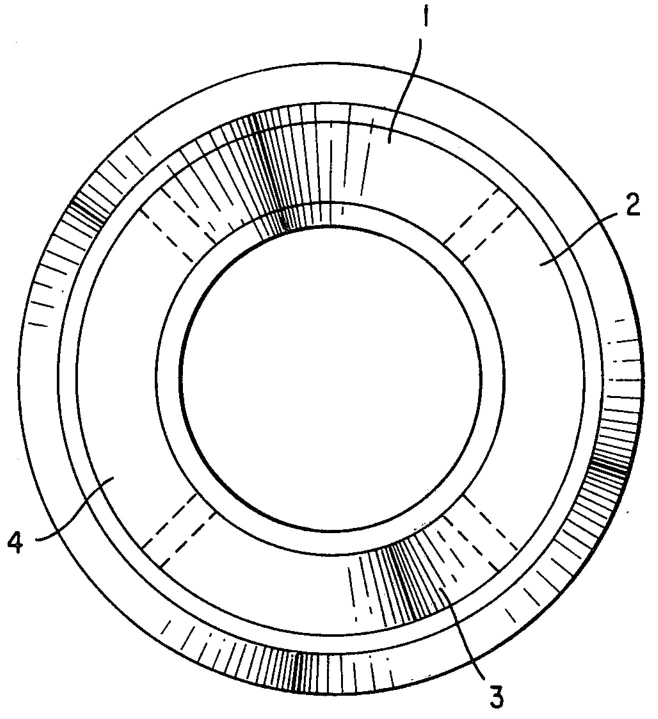
FIGS. 1A and 1B show an annular ultrasonic transducer made up of four segments.
Figure 1B:
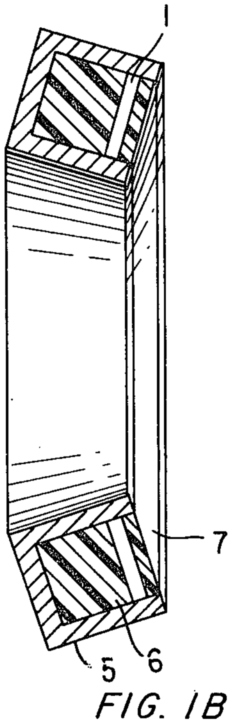
Figure 2:
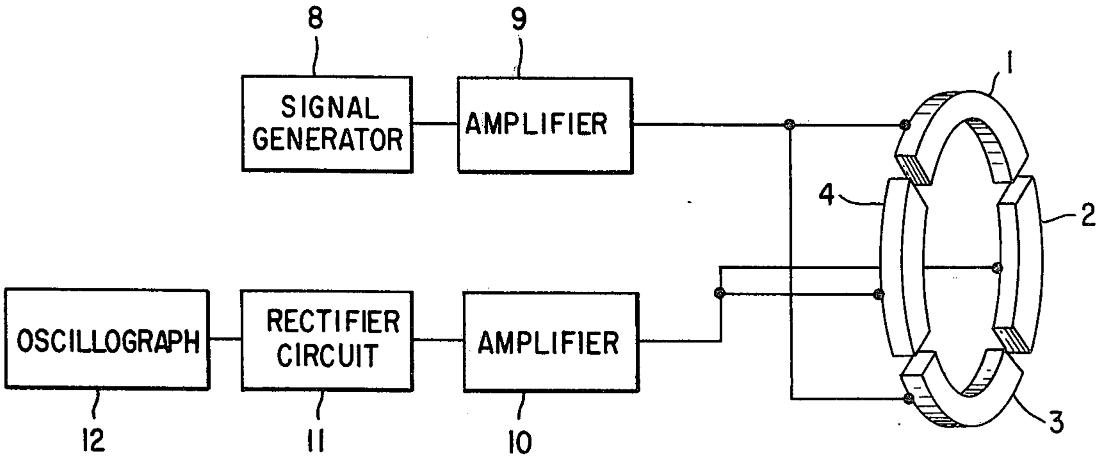
FIG. 2 is a block diagram of a circuit for performing a method embodying the invention.

The oppositely-disposed piezoelectric oscillators 1, 3 are used for transmission, and the remaining two 2, 4 are used for receiving. Thus, oscillators 1, 3 transmit an ultrasonic field which focuses in a focal line along the ring axis at a predetermined distance from the transducer. The length of the focal line determines the depth through which good lateral resolution is obtained. The distance between the focal line and the transducer depends substantially on the inclination of the piezoelectric oscillators to the ring axis. The length of the focal line is mainly determined by the width of the piezoelectric oscillators. The shape of the ultrasonic field transmitted by the two oscillators can be characterized by the intersecting surface which it forms with a given plane at right angles to the axis, e.g. between the transducer and the focal line, and which will hereinafter be called the cross-sectional area of the transmitted ultrasonic field, and corresponds to two oppositely-disposed quarter-rings, the ring diameter decreasing with distance from the transducer up to the focal line.

An electric signal for operating the transducer elements is produced by a generator 8 which can comprise or be connected to a timing circuit (not particularly shown). Generator 8 is connected to an amplifier 9 whose output is connected to transducer elements 1 and 3.

Transducer elements 2, 4 which receive the ultrasonic echoes, are connected to the input of an amplifier 10 whose output is connected via a rectifier circuit 11 to a cathode-ray oscillograph 12.

During operation, generator 8 produces a pulsed and limited signal which is amplified by amplifier 9 applied to the two segments 1 and 3 to stimulate them to oscillation. Elements 1, 3 transmit an ultrasonic field having a cross-sectional area corresponding to two oppositely-disposed quarter-rings. Echoes coming from reflectors in and outside the focal line are received by segments 2 and 4, which convert them into electric echo signals. The signals are fed to amplifier 10 whose output, after rectification, is displayed on the cathode-ray oscillograph.

The division of the annular ultrasonic transducer system into four segments, more particularly of equal size is a preferred embodiment. It is quite possible, however, to have a different subdivision, e.g. only one, or more than two, segments for each transmitting and receiving transducer. The receiving transducer can also have a different size from the transmitting transducer; in the case e.g. of a four-part transducer system the transmitting transducer can be larger than a quarter-ring and the receiving transducer can be correspondingly smaller, or vice versa.

The cathode-ray oscillograph in the described embodiment can be replaced by a recording and/or storage system.

In principle, the ultrasonic field required for the method of the invention can also be generated by suitably actuating transducer elements disposed in a matrix, instead of using an annular transducer system.

What is claimed is:

1. A method of reducing the echoes from reflectors disposed outside the focal line in an echo-sounding process using an ultrasonic field focusing in a focal line, which method comprises transmitting a pulsed ultrasonic wave having a cross-sectional area corresponding to one or more annular segments having a total azimuth angle of less than 360°, receiving echoes from the spatial region corresponding to at least a part of other annular segments which complement the annular segments of the cross-sectional area of the transmitted ultrasonic pulse to form a complete ring, and amplifying echo signals corresponding to the received echoes, rectifying the amplified echo signals and displaying the rectified echo signals, the said steps of amplifying, rectifying and displaying being carried out without any interruption between them.

2. A method according to claim 1, wherein the cross-sectional area of the transmitted ultrasonic pulse comprises two oppositely-disposed annular segments having an azimuth angle less than 180°, and the cross-sectional area of the received ultrasonic pulse corresponds to the remaining annular segments which are also oppositely disposed.

3. A method according to claim 2, wherein the cross-sectional area of the transmitted ultrasonic pulse corresponds to oppositely-disposed quarter-rings and the cross-sectional area of the received ultrasonic pulse corresponds to the two remaining quarter-rings.

4. In an echo-sounding arrangement using an ultrasonic field focusing in a focal line, apparatus for reducing the echoes from reflectors disposed outside the focal line, comprising a substantially annular ultrasonic transducer arrangement having a plurality of transducers the radiation or receiving surfaces of which are inclined towards the axis of the ring, a transmitter circuit operatively connected to the transducer arrangement for providing a pulsed transmitted ultrasonic wave having a cross-sectional area corresponding to one or more annular segments having a total azimuth angle of less than 360°, and a receiving circuit operatively connected to the transducer arrangement for receiving echoes from the spatial region corresponding to at least a part of other annular segments which complement the annular segments of the cross-sectional area of the transmitted ultrasonic pulse to form a complete ring, said transducer arrangement containing at least one pair of transmitting and one pair of receiving transducers each in the form of an annular segment which is permanently connected with the transmitter or receiver circuit respectively with the transmitting and receiving transducers having positions which alternate with one another along the annular arrangement, said receiver circuit including means for amplifying the echo signals delivered by the receiving transducers and means for rectifying the amplified echo signals, the output of said rectifying means being directly and permanently connected to the input of display means.

5. Apparatus according to claim 4, wherein the ultrasonic transducer system comprises oppositely-disposed pairs of transmitting and receiving transducers in the form of annular segments.

6. Apparatus according to claim 5, wherein the transducers are in the form of quarter-rings.

* * * * *